United States Patent [19]
Roskowski et al.

[11] Patent Number: 5,269,003
[45] Date of Patent: Dec. 7, 1993

[54] MEMORY ARCHITECTURE FOR STORING TWISTED PIXELS

[75] Inventors: Steven G. Roskowski, Sunnyvale; Dean Drako, Cupertino, both of Calif.

[73] Assignee: Apple Computer, Inc., Cupertino, Calif.

[21] Appl. No.: 964,568

[22] Filed: Oct. 21, 1992

Related U.S. Application Data

[63] Continuation of Ser. No. 528,221, May 24, 1990, abandoned.

[51] Int. Cl.[5] ............................................. G06F 15/62
[52] U.S. Cl. ..................................... 395/166; 395/164; 395/165
[58] Field of Search ........ 395/116, 117, 149, 162–166, 395/131, 132; 340/703

[56] References Cited

U.S. PATENT DOCUMENTS 5,043,713  8/1991  Katsura et al. .................. 395/165 X
5,047,958  9/1991  Comins et al. ...................... 395/166
5,162,788  11/1992  Lundblad et al. ............... 340/703 X Primary Examiner—Gary V. Harkcom
Assistant Examiner—Almis Jankus
Attorney, Agent, or Firm—Blakely, Sokoloff, Taylor & Zafman

[57] ABSTRACT

An arrangement for addressing a frame buffer memory including apparatus for selecting from the address bits designating a position in the frame buffer of a pixel to be displayed on an output display the bits indicating the word address of the pixel in a particular row of the frame buffer, apparatus for multiplying the word address by a fraction to provide a new word address, apparatus for recombining the new word address with the row address to provide a new address in the frame buffer for the information regarding the pixel to be displayed, and apparatus for controlling the storage of a data word describing the pixel beginning at a selected byte of the data word whereby the storage in the frame buffer of an unused portion of a data word describing the pixel may be eliminated.

31 Claims, 2 Drawing Sheets

MEMORY ARCHITECTURE FOR STORING TWISTED PIXELS

This is a continuation of application Ser. No. 07/528,221, filed May 24, 1990 now abandoned.

BACKGROUND OF THE INVENTION

1. Field of the Invention

This invention relates to memory arrangements for computer systems and, more particularly, to methods and apparatus for storing pixel information for bit-mapped computer displays.

2. History of the Prior Art

Computer graphics images are normally presented on bit-mapped output displays which furnish a rectangular array of rows and columns of pixels which are variously illuminated to provide the particular image. In such a display, the particular illumination at each pixel is controlled by pixel values stored in a frame buffer. A frame buffer is a memory array which contains a sufficient number of storage positions for all of the information necessary to control the illumination of each pixel of the output display, to describe the pixel as black or white, as a shade of grey, as one of a few colors, or as one of many colors. This storage normally is accomplished by binary devices; and there are typically one, eight, or twenty-four binary bits allotted for storing the information regarding each pixel. If the display is black and white, a single bit may suffice; if scales of grey or a few colors are shown, eight bits may be used; while a large number of colors may be provided by the use of twenty-four bits of storage.

Frame buffers may be organized in at least two different configurations. In one organization, each bit of a pixel is stored in a separate physical plane of the frame buffer so that a frame buffer capable of handling eight-bit color pixels has a total of eight planes for storing information; this organization allows individual bits of a pixel to be treated where this is useful. Contrasted to this is a second organization in which all of the bits of a pixel are stored serially in one plane; this organization allows individual pixels to be manipulated more easily.

While the typical storage required for each pixel in an advanced system is eight or twenty-four bit positions, almost all addressing in most computer systems is done by addresses which require thirty-two or sixteen bits of storage. In almost all modern personal computers, a thirty-two bit space is chosen to represent an addressable computer word (although these computers may typically address half-words as well) because precise powers of two are much easier to manipulate in a binary system. Thus, while the number of bits representing pixels most used are eight and twenty-four, the addressable space provided in frame buffers for storing that information is typically thirty-two bits. When the pixel information requires eight bits, four pixels may be stored in any addressable word space in a frame buffer, and no storage space is lost. However, typically, when handling twenty-four bit color information a single pixel is stored in each addressable word of a frame buffer; and the extra eight bits of the word space are wasted in a system which organizes the pixels to be stored serially. Since different programs may provide different levels of color output, it is an economic necessity that a computer be capable of handling both eight and twenty-four bits color information. Since four eight bit pixels fit precisely into the thirty-two bit word space, simply eliminating the extra eight bits is not an acceptable solution.

SUMMARY OF THE INVENTION

It is, therefore, an object of the present invention to reduce the cost of computer systems.

It is another object of the present invention to increase the performance of computer systems handling twenty-four bit color information stored serially in the frame buffer without wasting memory space in the frame buffer.

It is another more specific object of the present invention to provide an architecture for a frame buffer for a bit-mapped color display capable of handling twenty-four bit color information stored serially in the frame buffer without wasting memory space in the frame buffer.

These and other objects of the present invention are realized in an arrangement for addressing a frame buffer memory including apparatus for selecting from the address bits designating a position in the frame buffer of a pixel to be displayed on an output display the bits indicating the word address of the pixel in a particular row of the frame buffer, apparatus for multiplying the word address by a fraction to provide a new word address, apparatus for recombining the new word address with the row address to provide a new address in the frame buffer for the information regarding the pixel to be displayed, and apparatus for controlling the storage of a data word describing the pixel beginning at a selected byte of the data word whereby the storage in the frame buffer of an unused portion of a data word describing the pixel may be eliminated.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
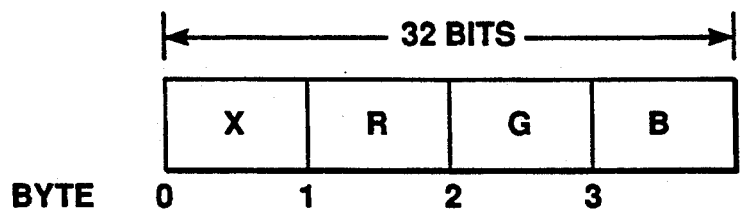
FIG. 1 is an illustration of storage typically provided for a single twenty-four bit pixel in a frame buffer which stores pixels serially.

Referring now to FIG. 1, there is shown an exemplary thirty-two bit word space which is typical of the word space provided in the frame buffer of an advanced personal computer which stores that information in serial form within the frame buffer. The thirty-two bits are divided into four individual eight-bit bytes which are typically designated as bytes 0, 1, 2, and 3. Twenty-four bit color information defining each pixel to be displayed on a computer output display appears in the order illustrated with a first eight bits (designated X) which is usually unused, a second eight bits (designated R) which indicates the red portion of the color information, a third eight bits (designated G) which indicates the green portion of the color information, and a fourth eight bits (designated B) which indicates the blue portion of the color information. As is illustrated in FIG. 1, the X information is typically stored in byte 0, the red information in byte 1, the green information in byte 2, and the blue information in byte 3 of the addressable word space. As is obvious from FIG. 1, the eight bits of byte zero in any addressable word are wasted in handling twenty-four bit color information when stored in this manner. The reason that such an arrangement is used is that addressing becomes very difficult if an attempt is made to fill the entire space of the frame buffer with useful information. The complications of such addressing have appeared to require multiple accesses of the frame buffer to read or write the color information relating to any individual pixel.

However, a typical frame buffer having one megabyte of storage is not large enough to store sufficient pixels to drive a standard 640 by 480 pixel output display (a display size which has become very common) using the typical storage arrangement. Were better use made of the frame buffer, a one megabyte frame buffer would suffice for storing the necessary pixels. For this reason attempts have been made to place the content-filled bits of each pixel in closer association with one another to eliminate the waste space in the frame buffer. For example, U. S. patent application Ser. No. 07/368,379, entitled Chunky Planar Data Packing Apparatus and Method, Lundblad et al., filed Jun. 16, 1989, assigned to the assignee of the present invention, describes one such arrangement. Although this arrangement does eliminate the wasted storage space in the frame buffer, addressing an individual pixel requires three individual accesses of the frame buffer and substantially slows the speed of operation of the system.

Figure 2:
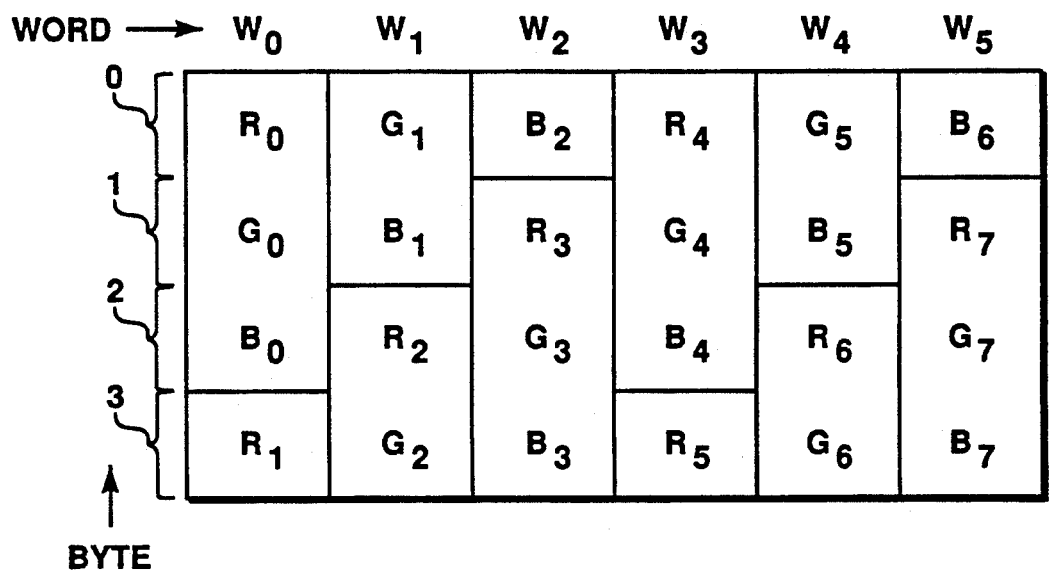
FIG. 2 is an illustration of the storage of a number of adjacent twenty-four bit pixels in a frame buffer which stores pixels serially in accordance with the present invention.

FIG. 2 illustrates an arrangement in accordance with the present invention for storing color information in a frame buffer which stores pixel information serially. This arrangement both eliminates the wasted storage space within the frame buffer and allows a single access to encompass the entire twenty-four bits of a color pixel. Although the addressing arrangement required for the present invention is somewhat complicated, the increase in system speed, the reduction of memory space, and the effective increase in system bandwidth more than make up for the increased complication.

In FIG. 2, the single word space illustrated in FIG. 1 is rotated by ninety degrees and aligned with five additional word spaces. Along the top of the figure are shown the designations for a total of six words, W0 through W5. The four bytes included in each word are indicated to the left of the figure starting with byte 0 at the top and continuing through byte 3 at the bottom of each word space. The pixel values for eight adjacent pixels are illustrated stored in the six individual word spaces, W0 through W5. As may be seen, the color information for the first pixel (designated pixel 0) is placed in the first three bytes of word space W0 aligned with red information R0 in byte 0, green information G0 in byte 1, and blue information B0 in byte 2. The last byte B0 of the pixel 0 is followed by the first byte of red information R1 of the second pixel (pixel 1) which resides in byte 3 of the word space W0. The green information G1 of the pixel 1 resides in byte 0 of the word space W1, the blue information B1 of the pixel 1 resides in byte 1 of the word space W1, and so on through the eight pixels represented in the figure.

It will be obvious that the arrangement illustrated in FIG. 2 does eliminate the wasted memory positions in the frame buffer a portion of which is illustrated. It may also be determined by reviewing the individual word spaces W0, W2, W3, and W5 that an access of a full 32 bit word in each case provides access to one complete pixel. However, the access of pixels 1, 2, 5, and 6 requires at least the access of two individual words, a process which would be thought to and which would require two access times in a typical addressing system. The arrangement of the present invention eliminates the requirement of two access times for any individual pixel when pixels are accessed in series.

Figure 3:
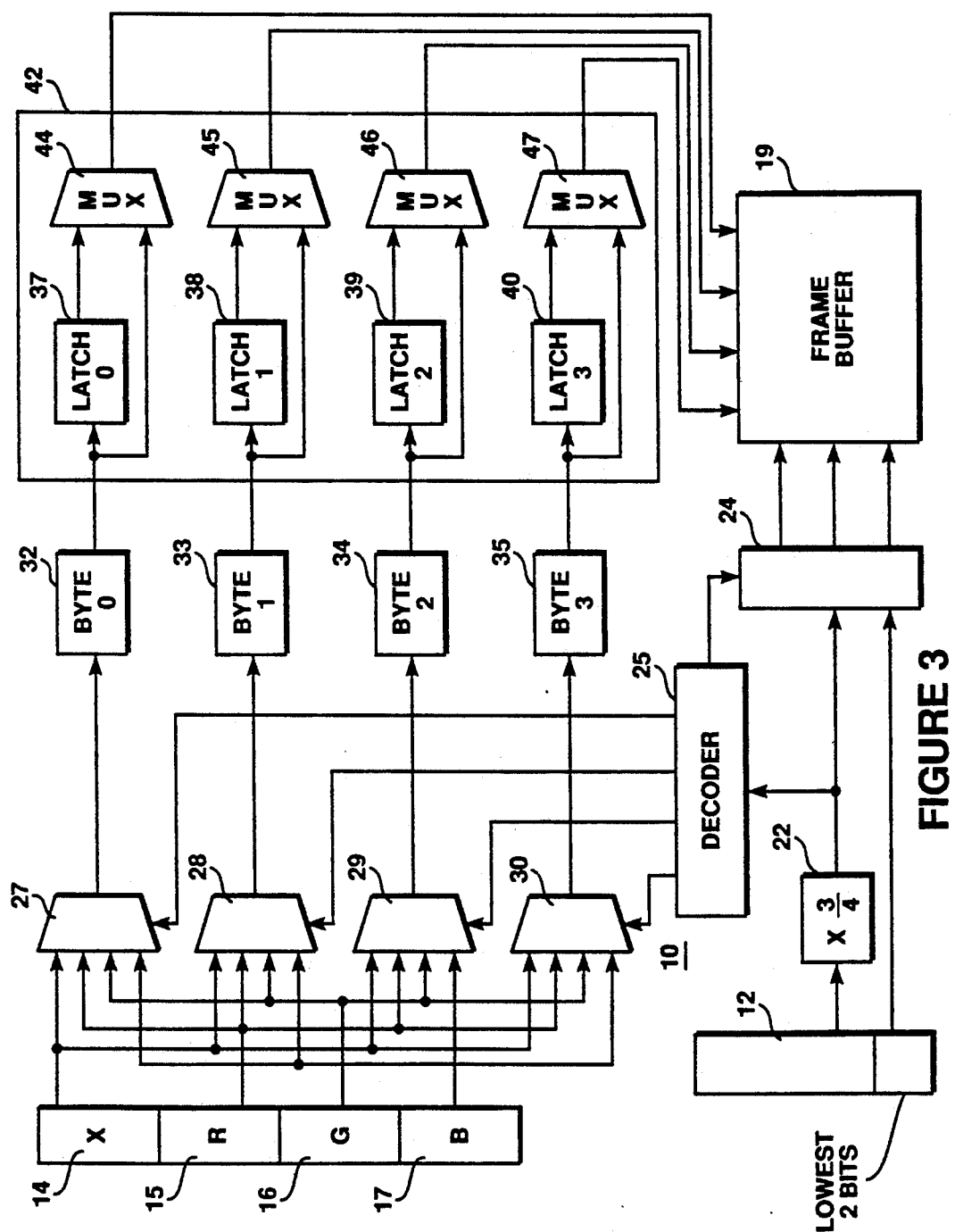
FIG. 3 is a block diagram illustrating an arrangement for addressing a frame buffer to provide storage in accordance with the arrangement shown in FIG. 2.

FIG. 3 illustrates in block diagram form an arrangement for mapping the twenty-four bit color information into a frame buffer so that the association of pixels illustrated in FIG. 2 is obtained. The arrangement 10 includes a register 12 for storing the address of the pixel color information which is to be placed in a frame buffer and a first set of four registers 14–17 for receiving the incoming pixel color information for the address placed in the register 12. The address placed in the register 12 is furnished by a central processing unit (not shown in the figure) and is the usual thirty-two bit address typically used in such systems. An address word utilized in the preferred embodiment of the invention is illustrated in FIG. 3. Such an address includes a number of high order bits which designate a frame buffer 19 and a row of the frame buffer 19 in which the information is to be stored and a number of low order bits (twelve in the preferred embodiment) which designate the word address in the row and the byte of that word. In the preferred embodiment, the lowest two bits indicate the byte within the word.

The bits of the address in the register 12 indicating the word addressed (but not the byte), are furnished to a circuit 22 which multiplies the word address by three-quarters. This is accomplished in a manner well known to those skilled in the art such as by shifting the bits by one position in a first direction to double their value, adding that value to the original value to obtain a value three times the original value, and shifting two bits in the other direction to divide the total by four. This provides an address which includes a two bit fractional portion in place of the lowest two bit designating the byte of a particular word. This new address provides the actual address in the frame buffer 19 to which the information in the registers 14–17 is to be directed.

While in a typical arrangement of color information in a frame buffer, a twenty-four bit color pixel would be addressed as starting in byte zero with the X byte of wasted space placed in this position and the remainder of the pixel simply filling the remainder of the word space, this is not the case in the present invention. When the word address portion of the address in register 12 is multiplied by three-quarters, the fractional portion of the result indicates in binary format the byte of a word in which the beginning red information byte is to be placed to accomplish the arrangement of FIG. 2 while the word value designates the specific word in which that byte resides. Thus, for pixel zero in a row, for example, multiplication by three-quarters gives a fraction of zero in word zero thus placing the red byte 0 in word zero byte 0; for pixel one, multiplication by three-quarters provides a result of three-quarters indicating byte three in word zero; for pixel two, multiplication by three-quarters provides a result of one and one-half indicating byte two in word one; and for pixel three, multiplication by three-quarters provides a result of two and one-quarter indicating byte one in word two. If each of the indicated pixels is placed so that its first red information byte is at the indicated byte in the indicated word, the positions illustrated in FIG. 2 are reached. Moreover, given sufficient address lines in the system, the fractional portion which allows individual bytes to be addressed allows any pixel to be addressed at its beginning red pixel so that the entire pixel may be accessed in a single access.

Not only may individual pixels be appropriately addressed as described above, but half words and individual bytes of any pixel may be accessed in the frame buffer 19. This is accomplished by associating the fractional portion of the word produced by the multiplication by three quarters with the two lowest order bits of the original address indicating the byte being accessed. It will be noted in FIG. 3 that the two low order bits are transferred to an interface circuit 24 to allow byte addressing in the frame buffer 19.

To accomplish these results, a decoder circuit 25 reads the lowest order bits of the address after the word address portion has been multiplied by three-quarters and, based on the results of the byte indicated by the lowest two bits, enables a set of four multiplexors 27–30 to transfer the eight bits of red information in register 15 to the selected one of a set of byte registers 32–35 and the bits in the registers 16 and 17 to the succeeding sets of byte registers. Thus, if pixel zero is addressed, the information in register 15 is placed in the "zero" byte register 32 by the multiplexor 27, the information in register 16 is placed in the "one" byte register 33 by the multiplexor 28, and the information in register 17 is placed in the "two" byte register 34 by the multiplexor 29. In the preferred embodiment, the register 14 is connected to the multiplexors 27 through 30 but is utilized only in implementing the inverse path of moving pixels from the frame buffer back to "normal" external space.

Thus, the first pixel (pixel zero) is transferred to the byte registers 32 through 34 in the proper order. When a single pixel, half word, or byte is being accessed for either a read or a write operation, the access may be accomplished in most cases (assuming there are sufficient address lines) by the arrangement of this invention. Since the decoder circuit 25 contains information designating the byte at which the access commences in the particular word, this information is furnished to the interface circuit 24 where it is decoded. If the access is of a full pixel which commences at byte 2, then the pixel crosses a word boundary with the blue byte falling in byte 0 of the next word. By splitting the wordlines, to allow byte addressing so that two words may be addressed, the address of the blue byte is incremented by one word; and a single access suffices for the pixel. In the preferred embodiment a 32 bit word is addressed on four separate chips each of which normally has nine lines each carrying the same information. In the preferred embodiment, seven lines to each of the four chips carry the same information while the two low order bits of two chips differ from the two low order bits of the other.

The same crossing of word boundaries occurs when the red byte of a full twenty-four bit pixel or the first byte of any half word addressed falls in byte 3 of a word. The decoder circuit 25 furnishes this information to the interface circuit 24 which increments the word address of the following bytes in the accessed portion so that only a single access of the frame buffer 19 is necessary.

It will be understood by those skilled in the art that the interface circuit 24 may be easily implemented to accomplish this result by including therein a state machine which utilizes the decoded information to determine where the first byte of the accessed information lies and the lowest order bytes of the original address to determine the type of byte.

If a sequence of pixels are being written in order to the frame buffer as in a burst transfer and a first pixel has been transferred to the byte register 32–34, when the next address and the next pixel information is received, the bits stored in the registers 32–35 are latched into registers 37 through 40, respectively, of an accumulator circuit 42. The values in the registers 32–35 are replaced by the values at the succeeding address. For example, when pixel one is addressed, the information in register 15 is placed in the three byte register 35 by the multiplexor 30, the information in register 16 is placed in the zero byte register 32 by the multiplexor 27, and the information in register 17 is placed in the two byte register 33 by the multiplexor 28.

In order that an entire word may be written to the frame buffer 19 on a single access for each of a sequence of pixels, the accumulator includes four multiplexors 44–47 which transfer information from the latches 37–40 and the registers 32–35 to the frame buffer 19 controlled by the information regarding the addresses which include the byte address of each pixel from the decoder 25. For example, word zero is filled in the frame buffer by transferring the values in latches 37, 38 and 39 and in register 35 to the addressed position in the frame buffer 19. Succeeding pixels are transferred in a similar manner so that each word is filled on a single access of the frame buffer 19.

In order to transfer the color information in the frame buffer 19 to the output display, the information is accessed by circuitry essentially identical to that for filling the buffer 19. Thus, information may be transferred by circuitry which is identical to the circuitry of FIG. 3 except that the decoder 25 operates to transfer the bytes of each pixel back to the positions they originally had before being twisted to fit the arrangement shown in FIG. 2. This may be accomplished by multiplying the address in the frame buffer by four-thirds to restore the pixels to the appropriate external word address. In a preferred embodiment, the same circuitry is actually used to accomplish the transformation. A word from the frame buffer 19 is placed in the registers 14–17 and transferred to the multiplexors 27–30 under control of the decoder 25 to the byte registers 32–35. The decoder 25 inverts the low two bits of the frame buffer address to automatically provide the four-thirds multiplication discussed above. Thus, the decoder 25 causes the multiplexors 27–30 to restore the pixels to the appropriate external word address. For example, the pixel stored at byte 3 of word zero when multiplied by four-thirds is three-fourths multiplied by four-thirds or one. This moves the pixel into word one where it commences (as do all pixels) at byte one, the first byte containing useful information. The decoded pixel may then be utilized externally.

Thus, there has been described an arrangement which optimizes the storage of twenty-four bit color information in a frame buffer while providing single access read and writes of such information for both single pixels and multiple sequential accesses of pixels.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer, an apparatus for addressing a pixel within a frame buffer memory by an input address within a single frame buffer memory cycle, said frame buffer memory having data words which define pixels, each of said data words having a position within said frame buffer memory, each of said data words further consisting of bytes, said apparatus comprising:

means for selecting a real word address from said input address, said real word address identifying a position of a pixel located in said frame buffer memory, said pixel to be displayed on an output display;

means for multiplying said real word address by a fraction value to provide a compressed word address, said means for multiplying coupled to receive said real word address from said means for selecting a real word address; and storing means for storing said bytes of said data word defining said pixel within a single memory cycle of said frame buffer, said storing means for eliminating from said frame buffer any unused portion of said data word, said storing means coupled to receive said compressed word address from said means for multiplying, said storing means further comprising:

means for referencing said frame buffer by said compressed word address to begin storing bytes to said frame buffer from a selected byte of said data word; and means for reordering said bytes of said data word to be stored in said frame buffer when said data word is to cross a word boundary within said frame buffer.

2. A computer implemented apparatus for addressing a frame buffer memory described in claim 1 wherein said storing means further comprises address generation means for generating, within a single frame buffer memory cycle, two addresses, one for each word that said data word crosses so that said data word may be accessed within a single frame buffer memory cycle.

3. A computer implemented apparatus for addressing a frame buffer memory as claimed in claim 1 wherein said means for multiplying said real word address by a fraction value in order to provide a compressed word address comprises means for multiplying said real word address by three fourths.

4. A computer implemented apparatus for addressing a frame buffer memory as claimed in claim 1 wherein:

said compressed word address comprises a range of bits including lowest order bits; and said storing means comprises decoder means for decoding said lowest order bits of said compressed word address, said decoder means also for sequentially ordering said bytes of said data word with reference to a particular byte position based on said decoding of said lowest order bits.

5. A computer implemented apparatus for addressing a frame buffer memory as claimed in claim 4 wherein said storing means further comprises:

first byte storing means for storing bytes of a first data word to be stored in said frame buffer memory at a first word address;

second byte storing means for storing bytes of a second data word to be stored in said frame buffer memory at a second word address; and byte selecting means for selecting bytes from said first data word and from said second data word to form a compressed data word associated with said compressed word address.

6. A computer implemented apparatus for addressing a frame buffer memory as claimed in claim 5 wherein:

said first byte storing means comprises a first set of logic registers;

said second byte storing means comprises a second set of logic registers; and said byte selecting means comprises a set of logic multiplexors controlled by outputs of said decoder means, said byte selecting means communicatively coupled to said first byte storing means and said byte selecting means also communicatively coupled to said second byte storing means.

7. A computer implemented apparatus for addressing a frame buffer memory as claimed in claim 1 further comprising:

means for selecting bits from said compressed word address, said bits creating a partial compressed word address which designates a particular row position of a display pixel in said frame buffer memory;

means for multiplying said partial compressed word address by a fraction value in order to provide said real word address, said means for multiplying communicatively coupled to said means for selecting bits; and retrieving means for transferring said compressed data word describing said pixel from said frame buffer memory, said retrieving means beginning at a selected byte of said compressed data word and transferring said compressed data word in order to formally reconstruct said compressed data word into said data word.

8. A computer implemented apparatus for addressing a frame buffer memory as claimed in claim 7 wherein said means for multiplying said partial compressed word address by a fraction value in order to provide said real word address comprises means for multiplying said partial compressed word address by three fourths.

9. In a computer, an apparatus for addressing a pixel within a frame buffer memory by an input address within a single frame buffer memory cycle, said frame buffer memory having data words which define pixels, each of said data words having a position within said frame buffer memory, each of said data words further consisting of bytes, said apparatus comprising:

(1) means for selecting a real word address from said input address, said real word address identifying a position of a pixel located in said frame buffer memory, said pixel to be displayed on an output display;

(2) means for multiplying said real word address by a fraction value to provide a compressed word address, said means for multiplying coupled to receive said real word address from said means for selecting a real word address;

(3) storing means for storing said bytes of said data word defining said pixel within a single memory cycle of said frame buffer, said storing means for eliminating from said frame buffer any unused portion of said data word, said storing means coupled to receive said compressed word address from said means for multiplying, said storing means further comprising:

means for referencing said frame buffer by said compressed word address to begin storing bytes to said frame buffer from a selected byte of said data word; and means for reordering said bytes of said data word to be stored in said frame buffer when said data word is to cross a word boundary within said frame buffer; and (4) means for accessing a twenty-four bit pixel in a single memory access cycle, said twenty-four bit pixel crossing a frame buffer word boundary in said frame buffer memory.

10. A computer implemented apparatus for addressing a frame buffer memory as claimed in claim 9 wherein said means for accessing a twenty-four bit pixel comprises:

means for accessing separate compressed data words having separate compressed word addresses in said frame buffer memory in the same memory access cycle; and means for accessing separate bytes within said separate compressed data words having separate compressed word addresses in said frame buffer memory.

11. A computer implemented apparatus for addressing a frame buffer memory as claimed in claim 9 wherein said means for accessing a twenty-four bit pixel comprises;

first byte storing means for storing bytes of a first data word to be stored at a first word address;

second byte storing means for storing bytes of a second data word to be stored at a second word address; and means for selecting bytes from said first data word and said second data word to form said data word for said compressed word address.

12. In a computer, an apparatus for memory addressing of a pixel of a frame buffer containing pixel information, said addressing of a pixel occurring within a single memory cycle, said frame buffer having discrete frame buffer word boundaries, each of said frame buffer word boundaries storing full pixel or partial pixel storage information, said apparatus comprising:

input means for supplying real pixel addresses and real pixel words associated with said real pixel addresses, said real pixel words representing display pixels;

address conversion means for converting said real pixel addresses into compressed pixel addresses, said address conversion means coupled to receive said real pixel addresses from said input means;

data conversion means for converting said real pixel words into compressed pixel words, said data conversion means coupled to receive said real pixel words from said input means; and data storage means for eliminating storage of any unused portion of said real pixel words, said data storage means for storing said compressed pixel words into said frame buffer within a single frame buffer memory cycle for each pixel, and for storing compressed pixel words that cross a frame buffer word boundary within a single frame buffer memory cycle for each pixel by reordering individual bytes of said compressed pixel words, said data storage means coupled to said data conversion means to receive said compressed pixel words from said data conversion means, said data storage means also coupled to said addressed conversion means to receive said compressed pixel addresses from said address conversion means, and said data storage means also coupled to said frame buffer.

13. A computer implemented apparatus for memory addressing of a frame buffer containing pixel information as described in claim 12 wherein said data storage means further comprises address generation means for generating, within a single frame buffer memory cycle, two addresses, one for each word that a compressed pixel word crosses so that said compressed pixel word may be accessed within a single frame buffer memory cycle.

14. The computer implemented apparatus for memory addressing of a frame buffer containing pixel information as described in claim 12 wherein said address conversion means comprises a multiplier means to multiply said real pixel address by a fraction value to provide said compressed pixel addresses.

15. The computer implemented apparatus for memory addressing a frame buffer containing pixel information as described in claim 14 wherein said fraction value of said multiplier means is three fourths.

16. The computer implemented apparatus for memory addressing a frame buffer containing pixel information as described in claim 12 wherein said data conversion means comprises:

a first register set to sequentially receive real pixel words in sequence;

a second register set to sequentially receive compressed pixel words in a first sequence;

a third register set to sequentially receive compressed pixel words in a second sequence; and multiplexer means for sequentially transferring said real pixel words in said first register set into said second register set according to a first predetermined transfer order, said multiplexer means also for sequentially transferring said real pixel words in said first register set into said third register set according to a second predetermined transfer order.

17. The computer implemented apparatus for memory addressing of a frame buffer containing pixel information as described in claim 16 wherein said data storage means comprises:

decoder means for decoding least significant bits of said compressed pixel words, said detector means for generating said first predetermined transfer order and said decoder means also for generating said second predetermined transfer order, said decoder means communicatively coupled to control said multiplexer means;

addressing means for addressing said frame buffer with reference to said compressed pixel addresses in order for said frame buffer to receive a frame buffer word that may span more than one frame buffer boundary; and selection means for selecting said frame buffer word among said second register set and said third register set, said selection means also for storing said frame buffer word into said frame buffer at a location which may cross more than one frame buffer boundary, said selection means communicatively coupled to: said frame buffer; said second register set; and said third register set.

18. The computer implemented apparatus for memory addressing a frame buffer containing pixel information as described in claim 17 wherein:

said frame buffer means comprises a plurality of logic memories, said logic memories for receiving bytes of said frame buffer word;

said addressing means comprises means for separately addressing each of said plurality of logic memories with separate addresses, one of said separate addresses being a first compressed pixel address and another of said separate addresses being an address next in sequence with reference to said first compressed pixel address; and said selection means comprises means for associating certain bytes of said second register set and said third register set with said separate addresses such that storage of said frame buffer word is effected in one memory access cycle even though said frame buffer word spans more than one frame buffer boundary of said frame buffer.

19. The computer implemented apparatus for memory addressing a frame buffer containing pixel information as described in claim 18 wherein:

said real pixel words are each 32 bits in length such that 8 bits do not represent data;

said compressed pixel words are each 24 bits in length; and said frame buffer boundaries are each 32 bits in length.

20. The computer implemented apparatus for memory addressing a frame buffer containing pixel information as described in claim 16 wherein:

said real pixel words arrive at said first register set in a serial sequence; and said multiplexer means sequentially transfers by first transferring said real pixel words from said first register set into said second register set forming said compressed pixel words in a first sequence and then transferring said real pixel words from said first register set into said third register set forming said compressed pixel words in said second sequence.

21. A computer implemented apparatus for memory addressing of a frame buffer containing pixel information as described in claim 12 further comprising:

address supply means for supplying compressed pixel addresses;

second address conversion means for converting said compressed pixel addresses into real pixel addresses, said second address conversion means coupled to receive said compressed pixel addresses from said address supply means;

data retrieval means for retrieving compressed pixel words from said frame buffer according to said compressed pixel addresses, said data retrieval means coupled to receive said compressed pixel addresses;

second data conversion means for converting said compressed pixel words into real pixel words and by so doing restoring any unused portion of said real pixel words, said second data conversion means coupled to receive said compressed pixel words from said data retrieval means.

22. The computer implemented apparatus for memory addressing a frame buffer containing pixel information as described in claim 21 wherein said second address conversion means comprises a multiplier means to multiply said compressed pixel addresses by a fraction value to provide said real pixel addresses.

23. The computer implemented apparatus for memory addressing a frame buffer containing pixel information as described in claim 22 wherein said fraction value of said multiplier means is four thirds.

24. The computer implemented apparatus for memory addressing a frame buffer containing pixel information as described in claim 21 wherein said data retrieval means comprises:

decoder means for decoding last significant bits of said compressed pixel words, said decoder means also for generating a predetermined transfer order;

addressing means for addressing one or more frame buffer boundaries of said frame buffer by a compressed pixel address in order for said frame buffer to transfer a compressed pixel word that may span one or more frame buffer boundary; and selection means for selecting said compressed pixel word from said addressed frame buffer boundaries.

25. The computer implemented apparatus for memory addressing a frame buffer containing pixel information as described in claim 24 wherein said second data conversion means comprises:

a first register set to sequentially receive said compressed pixel words, said first register coupled to said selection means;

a second register set to sequentially receive said real pixel words; and multiplexer means for transferring said compressed pixel words in said first register set into said second register set according to said predetermined transfer order to create said real pixel words, said multiplexer means coupled to said decoder.

26. The computer implemented apparatus for memory addressing a frame buffer containing pixel information as described in claim 24 wherein:

said frame buffer comprises a plurality of logic memories, said logic memories for providing bytes of said compressed pixel word;

said addressing means comprises means for separately accessing each of said plurality of logic memories with separate addresses, one of said separate addresses being a first compressed pixel address and another of said separate addresses being an address next in sequence to said first compressed pixel address; and said selection means comprises means for retrieving certain bytes of said separately accessed plurality of logic memories to retrieve said compressed pixel word that may span more than one frame buffer boundary such that retrieval of said compressed word is accomplished in one computer memory cycle.

27. The computer implemented apparatus for memory addressing a frame buffer containing pixel information as described in claim 26 wherein:

said real pixel words are each 32 bits in length such that 8 bits are not used for data storage;

said compressed pixel words are each 24 bits in length; and said frame buffer boundaries are each 32 bits in length.

28. In a computer, a method for memory addressing a frame buffer containing pixel information within a single frame buffer memory cycle, said frame buffer having discrete frame buffer word boundaries, each of said frame buffer word boundaries storing full pixel or partial pixel storage information, said method comprising the logic implemented steps of:

supplying real pixel addresses and real pixel words associated with said real pixel addresses, said real pixel words representing display pixels;

converting said real pixel addresses into compressed pixel addresses by multiplying said real pixel addresses by a fraction value;

converting said real pixel words into compressed pixel words; and storing said compressed pixel words into said frame buffer within a single frame buffer memory cycle to eliminate storage into said frame buffer of any used portion of said real pixel words, said step of storing comprising the steps of:

referencing from said compressed pixel addresses; and storing said compressed pixel words that cross a frame buffer word boundary within a single frame buffer memory cycle by reordering individual bytes of said compressed pixel words based on a byte position where said compressed pixel word crosses said frame buffer word boundary.

29. The method for memory addressing of a frame buffer containing pixel information within a single frame buffer memory cycle as described in claim 28 wherein said step of storing further comprises, for each pixel data crossing said frame buffer word boundary, the step of generating two addresses, a compressed pixel address and said compressed pixel address incremented by one.

30. In a computer, a method for memory addressing a frame buffer containing pixel information within a single frame buffer memory cycle, said frame buffer having discrete frame buffer word boundaries, each of said frame buffer word boundaries storing full pixel or partial pixel storage information, said method comprising the logic implemented steps of:

supplying a real pixel address, said real pixel addresses representing a display pixel;

converting said real pixel address into a compressed pixel address by multiplying said real pixel address by a fraction value; and retrieving a real pixel word from said frame buffer, said step of retrieving occurring within a single frame buffer memory cycle, said step of retrieving comprising the steps of:

referencing from said compressed pixel address; and retrieving pixel data that represents a compressed pixel word that crosses a frame buffer word boundary by reordering individual bytes of said compressed pixel words based on a byte position where said compressed pixel word crosses said frame buffer word boundary.

31. The method for memory addressing of a frame buffer containing pixel information within a single frame buffer memory cycle as described in claim 30 wherein said step of retrieving further comprises, for each pixel data crossing said frame buffer word boundary, the step of generating two addresses, a compressed pixel address and said compressed pixel address incremented by one, to retrieve said pixel data that represents a compressed pixel word that crosses a frame buffer word boundary.

* * * * *